United States Patent
Takada et al.

(10) Patent No.: US 7,692,330 B2
(45) Date of Patent: Apr. 6, 2010

(54) ELECTRONIC EQUIPMENT, AND BATTERY PACK AND LOAD APPARATUS USED IN THE SAME

(75) Inventors: Masahiro Takada, Osaka (JP); Toshihiko Ichinose, Nara (JP); Takeshi Shimamoto, Osaka (JP); Junko Shimamoto, legal representative, Osaka (JP)

(73) Assignee: Panasonic Corporation, Osaka (JP)

( * ) Notice: Subject to any disclaimer, the term of this patent is extended or adjusted under 35 U.S.C. 154(b) by 950 days.

(21) Appl. No.: 11/477,803

(22) Filed: Jun. 30, 2006

(65) Prior Publication Data

US 2007/0009770 A1    Jan. 11, 2007

(30) Foreign Application Priority Data

Jun. 30, 2005    (JP) .............................. 2005-191413

(51) Int. Cl.
*H02J 1/12*    (2006.01)
(52) U.S. Cl. ........................................................ 307/45
(58) Field of Classification Search ................... 307/43, 307/44, 45
See application file for complete search history.

(56) References Cited

U.S. PATENT DOCUMENTS 5,886,424 A * 3/1999 Kim .............................. 307/64
6,590,370 B1 7/2003 Leach
7,274,116 B2 * 9/2007 Inoue et al. .................. 307/100
2004/0174072 A1 * 9/2004 Bourilkov et al. ............. 307/66
2006/0194082 A1 * 8/2006 Tucker et al. .................. 429/9

FOREIGN PATENT DOCUMENTS

JP    2004-208344    7/2004

* cited by examiner

*Primary Examiner*—Jared J Fureman
*Assistant Examiner*—Michael Rutland Wallis
(74) *Attorney, Agent, or Firm*—McDermott Will & Emery LLP

(57) ABSTRACT

Electronic equipment is provided in which a bi-directional voltage converter is connected between a fuel cell and a secondary battery, and a load apparatus is connected in parallel to the fuel cell. Further, if a plurality of voltage converters are provided, when each output voltage is closer to an output voltage of the secondary battery than an output voltage of the fuel cell, they are classified into a first voltage-converter group, while being closer to the output voltage of the fuel cell than the output voltage of the secondary battery, they are sorted out as a second voltage-converter group. Then, the secondary battery is connected in parallel to the first voltage-converter group and the fuel cell is connected in parallel to the second voltage-converter group.

13 Claims, 11 Drawing Sheets

ELECTRONIC EQUIPMENT, AND BATTERY PACK AND LOAD APPARATUS USED IN THE SAME

BACKGROUND OF THE INVENTION

1. Field of the Invention

The present invention relates to electronic equipment provided with a fuel cell, and a battery pack and a load apparatus used in this electronic equipment. Particularly, it relates to a suitable circuit configuration of a power-source section.

2. Description of the Background Art

Conventionally, electronic equipment such as a notebook computer and a cellular phone is provided with a plurality of voltage converters. It includes a power source which outputs several voltages, using a voltage converter which drops the voltage of a secondary battery or a voltage converter which boosts the voltage of the secondary battery. As the input power source of these voltage converters, the method of connecting them to the secondary battery has generally been adopted.

FIG. 10 is a block diagram, showing conventional electronic equipment such as a notebook personal computer on the market. A battery pack 400 is formed only by a secondary battery 102, not including a fuel cell. Both terminals 106, 108 of the secondary battery 102 are connected to both terminals 306, 308 of a load apparatus 300, respectively. In the load apparatus 300, the electric power inputted in four voltage converters 311 to 314 is all supplied from the secondary battery 102. The voltage converters 311 to 314 output voltages V1 to V4 after their conversion, respectively, to a function circuit 303.

In recent years, as the power source of electronic equipment such as a notebook computer and a mobile phone, a fuel cell has received attention which is capable of supplying electric power continuously for a long time. Such electronic equipment usually undergoes a sharp load fluctuation, while the electric power generated by a fuel cell cannot be rapidly changed. Hence, a secondary battery is charged with the power generated by the fuel cell, and simultaneously, the secondary battery supplies electric power to the electronic equipment. This is called a hybrid-type fuel-cell system, which has been offered in various forms. Among them, for example, Japanese Patent Laid-Open No. 2004-208344 specification gives the method of using a portable terminal which includes a fuel cell, a plurality of secondary batteries and a plurality of function circuits, so that energy utilization efficiency can be enhanced.

On the other hand, in order to charge a secondary battery with the electric power generated by a fuel cell, a voltage converter (i.e., a DC/DC converter) is required which converts the voltage of the fuel cell into the voltage of the secondary battery. In this case alike, as the input power source of a plurality of voltage converters, the method of connecting them to the secondary battery is in common use. Thus, such a method is proposed as controlling the fuel cell's output voltage so that it can be kept constant (e.g., refer to U.S. Pat. No. 6,590,370 specification).

FIG. 11 is a graphical representation, showing current-voltage characteristics according to the supply of fuel in a fuel cell formed by connecting six cells in series. In FIG. 11, the vertical axis indicates the output voltage (V) of a DMFC (or direct methanol fuel cell), and the horizontal axis represents the output current (A) of the DMFC. Reference characters and numerals C11, C12, C13 each denote a current-voltage characteristic curve if the total fuel supply is 0.6 cc/min, 1.2 cc/min, 1.8 cc/min, respectively.

As can be seen from FIG. 11, the larger the fuel supply becomes, the greater output current can be obtained. As shown by C11 to C13, the greater the output current becomes, the lower the output voltage will be.

In addition, if the fuel cell's output voltage is controlled so as to be fixed, as the supply of a fuel (i.e., methanol) is increased, the output current (A) rises. In the example shown in FIG. 1, if the fuel cell's output voltage is controlled so as to be kept at 2.4 V, in the case of the total fuel supplies like C11, C12, C13, each current (A) increases like I1, I2, I3, respectively. Therefore, the electric power generated by the fuel cell can be controlled by controlling the total fuel supply. In this way, in order to control the fuel cell's generation power using the fuel supply, it is desirable that the method be adopted of controlling the fuel cell's output voltage so that it is kept constant.

FIG. 12 is a block diagram, showing conventional electronic equipment in which a battery pack provided with a fuel cell is used. A load apparatus 300 shown in FIG. 12 is configured in the same way as FIG. 10. A battery pack 500 is configured by a fuel cell 101, a voltage converter 103 and a secondary battery 102.

Inside of the load apparatus 300, a voltage-converter group 301 is provided which is formed by four voltage converters 311 to 314 of 12 V, 10 V, 1.5 V, 1.25 V, respectively. The voltage converters 311, 312 of 12 V, 10 V are step-up circuits, and the voltage converters 313, 314 of 1.5 V, 1.25 V are step-down circuits. The electric power consumed by these four voltage converters 311 to 314 is all supplied from the secondary battery 102, as is the case with FIG. 10.

However, in a conventional hybrid-type fuel-cell system, it is difficult to supply electric power from a fuel cell to a function circuit whose load fluctuates sharply. This is because even if the flow rate of supplied fuel is changed, the fuel cell's output power does not vary rapidly. Judging from the fuel cell's output-current characteristic, the electric-current value of a load apparatus cannot suitably respond to a sharp change in its power consumption.

In addition, in the conventional electronic equipment shown in FIG. 12, for example, if the fuel cell 101's output voltage is 2.4 V and if the secondary battery 102's output voltage is 6 to 8.4 V, the electric power of the voltage converters 313, 314 of 1.5 V, 1.25 V is used after the following procedure. In a steady state, the voltage from the fuel cell 101 is boosted by the voltage converter 103, and then, the secondary battery 102 is charged. Thereafter, the voltage is dropped to 1.5 V, 1.25 V. In short, the fuel cell 101's output voltage is stepped up, and afterward, the voltage is stepped down. This causes a power loss, thus making such electronic equipment inefficient.

On the other hand, if the fuel cell 101's output voltage is 10 V and if the secondary battery 102's output voltage is 6 to 8.4 V, the electric power of the voltage converters 311, 312 of 12 V, 10 V is used after the following procedure. In a steady state, the voltage from the fuel cell 101 is dropped by the voltage converter 103, and then, the secondary battery 102 is charged. Thereafter, the voltage is boosted to 12 V, 10 V. In short, the fuel cell 101's output voltage is stepped down, and afterward, the voltage is stepped up. This causes a power loss, thereby making the electronic equipment inefficient.

In this way, in such a conventional hybrid-type fuel-cell system, from the secondary battery 102, electric power is supplied to the load apparatus 300. Hence, if the power-source voltage of the function circuit 303 is lower than the fuel cell 101's output voltage, for example, even if the function circuit 303 is a CPU circuit or the like, then the input of the voltage converter which supplies electric power to the function circuit 303 needs to be supplied from the secondary battery 102. As a result, after the fuel cell 101's output voltage is boosted to the secondary battery 102's output voltage, the secondary battery 102's output voltage is dropped to the function circuit 303's power-source voltage which is lower than the fuel cell 101's output voltage. Or, in contrast, after the fuel cell 101's output voltage is stepped down to the secondary battery 102's output voltage, the secondary battery 102's output voltage is stepped up to the function circuit 303's power-source voltage which is higher than the fuel cell 101's output voltage. Such an operation causes a power-conversion loss, thus raising an undesirable situation in respect of how to use energy efficiently.

SUMMARY OF THE INVENTION

It is an object of the present invention to provide electronic equipment which is capable of supplying electric power from a fuel cell to a load apparatus whose load fluctuates sharply.

Electronic equipment according to an aspect of the present invention, comprising a power-source section and a load apparatus, wherein: the power-source section includes a fuel cell, a secondary battery, and a bi-directional voltage converter which is connected between the fuel cell and the secondary battery, and converts bi-directionally an output voltage of the fuel cell and an output voltage of the secondary battery; and the load apparatus is connected in parallel to the fuel cell.

In this electronic equipment, the voltage outputted from the fuel cell is adjusted to a constant voltage by the bi-directional voltage converter. At this time, the bi-directional voltage converter is used, and thus, even if the electric power generated by the fuel cell is smaller than the electric power consumed in the load apparatus, then the bi-directional voltage converter can supply electric power from the secondary battery to the output side of the fuel cell while keeping the voltage constant at both ends of the fuel cell. Thereby, electric power can be stably supplied to the load apparatus. Hence, even if the load apparatus undergoes a sharp temporal fluctuation in its load, it can receive a power supply from the fuel cell. In short, from the fuel cell, the load apparatus subjected to a sharp load fluctuation can be supplied with electric power.

These and other objects, features and advantages of the present invention will become more apparent upon reading of the following detailed description along with the accompanied drawings.

DESCRIPTION OF THE PREFERRED EMBODIMENTS

Hereinafter, each embodiment of the present invention will be described with reference to the attached drawings.

First Embodiment

Figure 1:
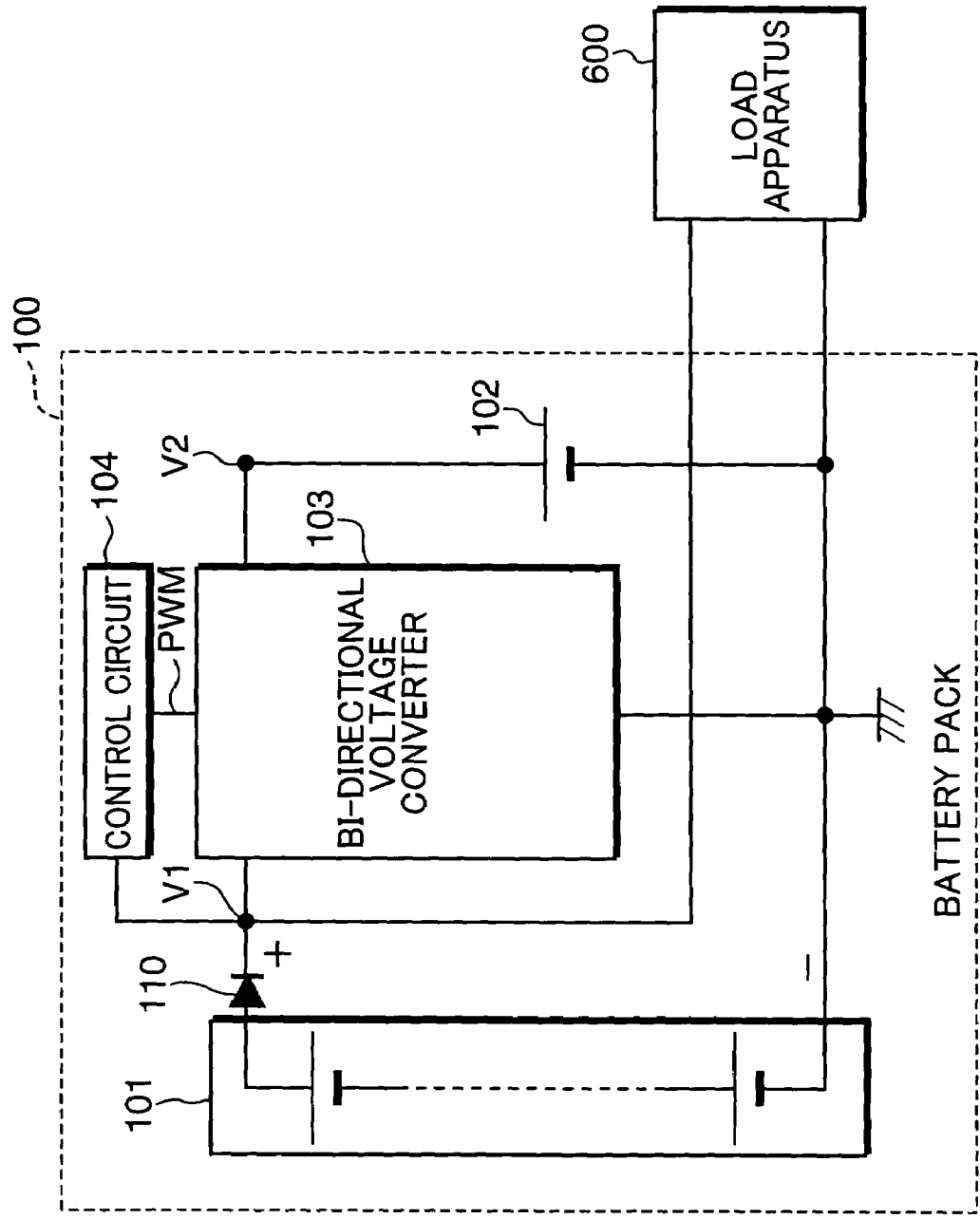
FIG. 1 is a block diagram, showing electronic equipment according to a first embodiment of the present invention.

First, a description will be given about electronic equipment according to a first embodiment of the present invention. FIG. 1 is a block diagram, showing the electronic equipment according to the first embodiment.

The electronic equipment shown in FIG. 1 includes a battery pack 100 and a load apparatus 600. The battery pack 100 is provided with a fuel cell 101, a secondary battery 102, a bi-directional voltage converter 103, a control circuit 104 and a rectifying element 110. The fuel cell 101 is formed by connecting six active-type DMFCs (or direct methanol fuel cells) in series. The secondary battery 102 is formed by connecting two Li-ion cells in series.

The fuel cell and the secondary battery are not limited especially to this example. As the fuel cell, a passive-type DMFC, a DDFC (or direct DME fuel cell), an RMFC (or reformed methanol fuel cells) or the like may also be used. As the secondary battery, a nickel-hydrogen storage battery or the like may also be used. Besides, the number of such cells in series, or another such factor, may also be varied.

The rectifying element 110 is connected between the fuel cell 101 and the bi-directional voltage converter 103. If the voltage generated by the fuel cell 101 is lower than a target voltage, an electric current is hindered from flowing into the fuel cell 101. In addition, instead of rectifying element 110, a switch may also be provided. In this case, when an electric current is supplied from the secondary battery 102 to the load apparatus 600, this switch is opened.

The load apparatus 600 is provided with a function circuit which undergoes a sharp load fluctuation, such as a CPU circuit, a voltage converter which supplies electric power to the function circuit, and the like. As the load apparatus 600 (i.e., the electronic equipment), a mobile equipment is used. For example, a notebook personal computer, a cellular phone or the like is used.

First, a case will be described in which the output voltage of the fuel cell 101 is set below the output voltage of the secondary battery 102. In this embodiment, as the bi-directional voltage converter 103, a step-up type bi-directional voltage converter is used which will be described below. The control circuit 104 adjusts the duty ratio of a PWM signal which is applied to the step-up type bi-directional voltage converter 103, so that the fuel cell 101's output voltage becomes 2.4 V. Besides, the output voltages of the fuel cell and the secondary battery are not limited especially to the above described example. They can be varied, which is also applied to the other embodiments.

Figure 2:
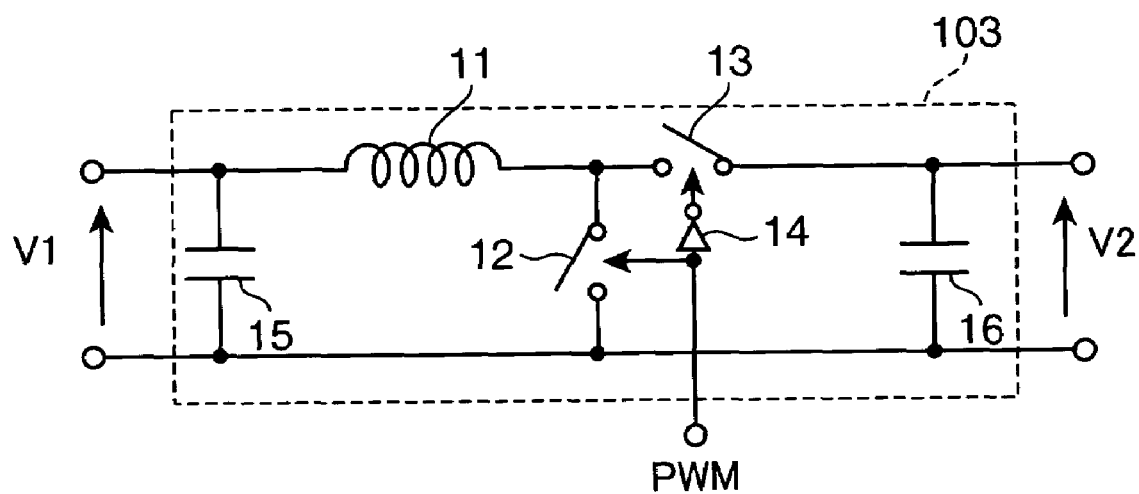
FIG. 2 is a circuit diagram, showing the configuration of a step-up type bi-directional voltage converter which is used as a bi-directional voltage converter shown in FIG. 1.

FIG. 2 is a circuit diagram, showing the configuration of a step-up type bi-directional voltage converter which is used as the bi-directional voltage converter 103 shown in FIG. 1. The step-up type bi-directional voltage converter 103 shown in FIG. 2 includes a coil 11, switching elements 12, 13, an inverter 14, and capacitors 15, 16.

The capacitor 15 is connected between an output terminal on the side of the fuel cell 101, and a common ground terminal on the side of the fuel cell 101 and on the side of the secondary battery 102. The capacitor 16 is connected between an output terminal on the side of the secondary battery 102, and a common ground terminal on the side of the fuel cell 101 and on the side of the secondary battery 102. One end of the coil 11 is connected to the output terminal on the side of the fuel cell 101, and the other end is connected to one end of the switching elements 12, 13. The other end of the switching element 12 is connected to a common ground terminal on the side of the fuel cell 101 and on the side of the secondary battery 102. The other end of the switching element 13 is connected to the output terminal on the side of the secondary battery 102.

A control terminal of the switching element 12 receives the PWM signal from the control circuit 104. Upon inputting a high-level signal, the switching element 12 turns on, while it turns off on inputting a low-level signal. The inverter 14 inverts the PWM signal from the control circuit 104 and outputs it to a control terminal of the switching element 13. Upon inputting a high-level signal, the switching element 13 turns on, while it turns off on inputting a low-level signal. As the switching elements 12, 13, for example, an FET can be used.

The above described elements form a synchronous-rectification type bi-directional DC/DC voltage converter. The bi-directional voltage converter 103 functions as a step-up type bi-directional voltage converter. In such a method as described below, it boosts the fuel cell 101's output voltage 2.4 V to the secondary battery 102's output voltage 6 to 8.4 V.

Figure 3:
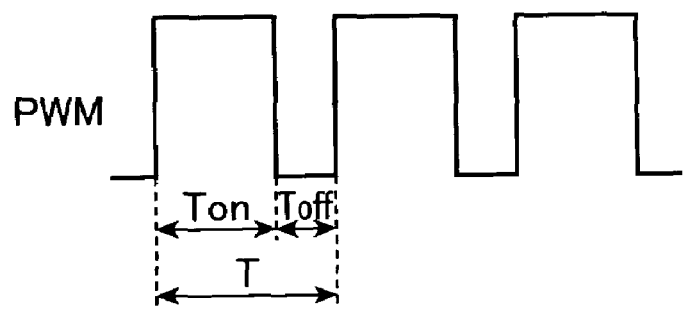
FIG. 3 is a wave-form chart, showing the duty ratio of a PWM signal which is outputted from a control circuit shown in FIG. 1.

FIG. 3 is a wave-form chart, showing the duty ratio of the PWM signal which is outputted from the control circuit 104 shown in FIG. 1. The control circuit 104 outputs the PWM signal shown in FIG. 3 to the bi-directional voltage converter 103. Using a high period Ton and a one-cycle period T of the PWM signal, a duty ratio Dt shown in the following expression (1) is given.

$$Dt = Ton/T \quad (1)$$

The control circuit 104 outputs the PWM signal at a high level for the period Ton, and shorts the switching element 12 and simultaneously opens the switching element 13. On the other hand, the control circuit 104 outputs the PWM signal at a low level for a period Toff, and opens the switching element 12 and simultaneously shorts the switching element 13. If the switching elements 12, 13 are operated in this way, then a voltage V1 (on the left side) of the fuel cell 101, an output voltage V2 (on the right side) of the secondary battery 102 and the PWM signal's duty ratio Dt establish the relation of the following expression (2).

$$V2/V1 = 1/(1-Dt) \quad (2)$$

The control circuit 104 detects the voltage V1 of the fuel cell 101 and calculates the difference between this detection voltage and the target voltage 2.4 V. Using the expression (2), it calculates the PWM-signal duty ratio Dt so that this difference becomes zero. Then, it outputs the PWM signal which has this duty ratio Dt to the bi-directional voltage converter 103.

As described above, in this embodiment, the voltage V1 of the fuel cell 101 is measured, the difference is calculated between it and the target voltage 2.4 V, and a duty ratio is determined so that this difference becomes zero. Therefore, the voltage V1 of the fuel cell 101 can be controlled so as to be fixed at 2.4 V.

Figure 4:
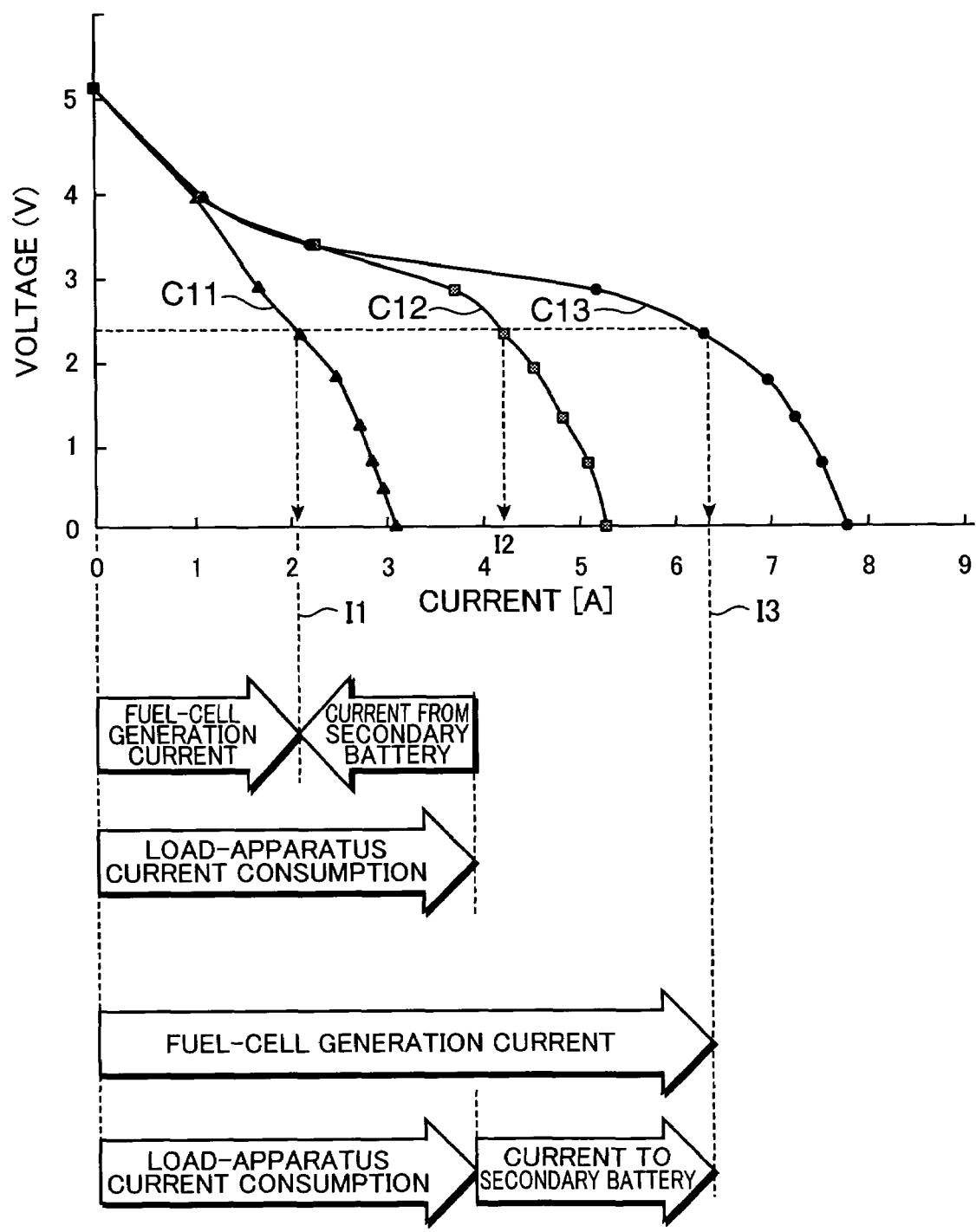
FIG. 4 is a graphical representation, showing current-voltage characteristics according to the supply of fuel to a fuel cell formed by connecting six cells in series, and the supply of an electric current to a load apparatus.

Next, a description will be given about the supply of an electric current to the load apparatus 600. FIG. 4 is a graphical representation, showing current-voltage characteristics according to the supply of fuel to the fuel cell 101 formed by connecting six cells in series, and the supply of an electric current to the load apparatus 600. In the upper half of FIG. 4, the vertical axis indicates the output voltage (V) of the fuel cell 101, and the horizontal axis represents the output current (A) of the fuel cell 101. Reference characters and numerals C11, C12, C13 each denote a current-voltage characteristic curve if the total fuel supply is 0.8 cc/min, 1.6 cc/min, 3.2 cc/min, respectively.

There is a case where the electric current generated by the fuel cell 101 is small at a constant voltage, and thus, the current generated by the fuel cell 101 is smaller than a current consumption of the load apparatus 600. This case can take place, if the electric power generated by the fuel cell 101 is small at its start time or another such time, or if the load apparatus 600's current consumption increases suddenly. In such a case, for example, if the generated electric current shown in FIG. 4 is I1, the electric current generated by the fuel cell 101 is supplied from the secondary battery 102 to the load apparatus 600. Then, from the secondary battery 102, the short electric current is supplied to the load apparatus 600.

In contrast, there is a case where the power generation of the fuel cell 101 is stable, the electric current generated by the fuel cell 101 is sufficiently large at a constant voltage, and the current generated by the fuel cell 101 is greater than a current consumption of the load apparatus 600. In this case, for example, if the generated electric current shown in FIG. 4 is I3, the electric current generated by the fuel cell 101 is supplied to the load apparatus 600. At the same time, the excess electric current is supplied to the secondary battery 102 to charge the secondary battery 102.

In other words, irrespective of the relation in terms of greatness between an electric current Io generated by the fuel cell 101, an electric current Ic consumed by the load apparatus 600 and an electric current Is to the secondary battery 102, the output voltage of the fuel cell 101 becomes constant. Each electric current satisfies the following expression (3).

$$Io = Ic + Is \quad (3)$$

Incidentally, the electric current Is to the secondary battery 102 means that at the time of a minus, an electric current is sent from the secondary battery 102 to the load apparatus 600.

As described above, in this embodiment, there are cases where an electric current flows into the bi-directional voltage converter 103 from the side (i.e., the V1 side) of the fuel cell 101, and an electric current is supplied to the side (i.e., the V1 side) of the fuel cell 101 from the bi-directional voltage converter 103. In either case, using the step-up type bi-directional voltage converter 103 which has the circuit configuration shown in FIG. 2, the voltage V1 of the fuel cell 101 can be controlled so as to be kept constant. As a result, electric power is stably supplied to the load apparatus 600. Therefore, even if the load apparatus 600's load temporally fluctuates sharply, electric power can be supplied from the fuel cell 101. This makes it possible to supply electric power from the fuel cell 101 to the load apparatus 600 which undergoes a sharp load fluctuation.

Second Embodiment

Figure 5:
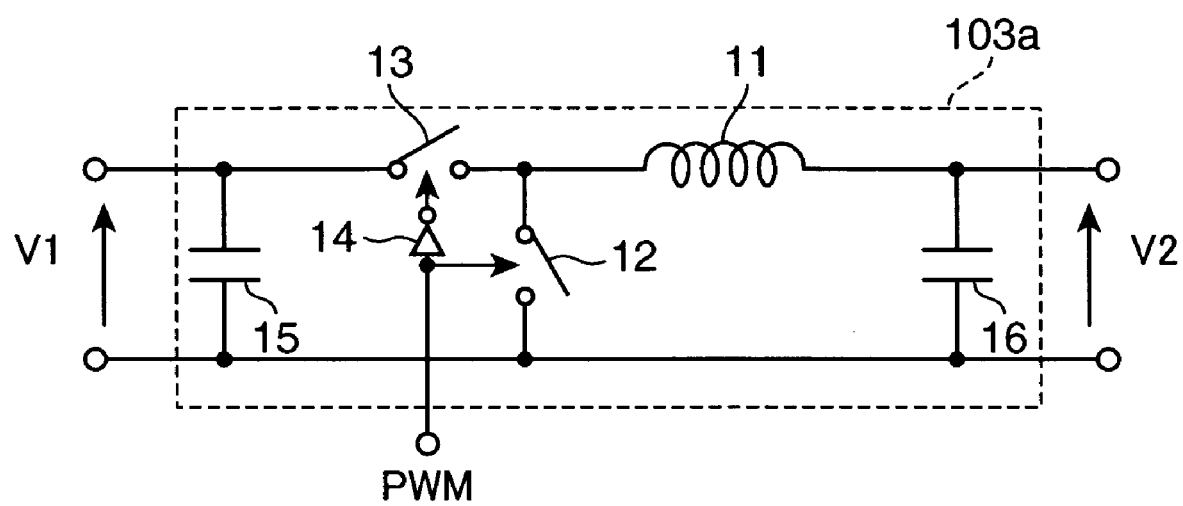
FIG. 5 is a circuit diagram, showing the configuration of a step-down type bi-directional voltage converter which is used in electronic equipment according to a second embodiment of the present invention.

Next, a description will be given about electronic equipment according to a second embodiment of the present invention. FIG. 5 is a circuit diagram, showing the configuration of a step-down type bi-directional voltage converter which is used in the electronic equipment according to the second embodiment. In the electronic equipment according to this embodiment, the output voltage of a fuel cell is set above the output voltage of a secondary battery. Then, using a step-down type bi-directional voltage converter, the duty ratio of a PWM signal which is inputted to the bi-directional voltage converter is adjusted so that the fuel cell's output voltage becomes 10 V. Hence, this embodiment is different from the first embodiment, in the following point. A step-down type bi-directional voltage converter 103a shown in FIG. 5 is used, instead of the step-up type bi-directional voltage converter 103 shown in FIG. 2. In the other respects, it is the same as the electronic equipment shown in FIG. 1, which is used as the one which shows its entire configuration. Thus, a new figure and a detailed description are omitted.

The bi-directional voltage converter 103a shown in FIG. 5 includes a coil 11, switching elements 12, 13, an inverter 14, and capacitors 15, 16.

The capacitor 15 is connected between an output terminal on the side of the fuel cell 101, and a common ground terminal on the side of the fuel cell 101 and on the side of the secondary battery 102. The capacitor 16 is connected between an output terminal on the side of the secondary battery 102, and a common ground terminal on the side of the fuel cell 101 and on the side of the secondary battery 102. One end of the switching element 13 is connected to the output terminal on the side of the fuel cell 101, and the other end is connected to one end of the coil 11 and one end of the switching element 12. The other end of the coil 11 is connected to the output terminal on the side of the fuel cell 101, and the other end of the switching element 12 is connected to a common ground terminal on the side of the fuel cell 101 and on the side of the secondary battery 102.

A control terminal of the switching element 12 receives a PWM signal from the control circuit 104. Upon inputting a high-level signal, the switching element 12 turns on, while it turns off on inputting a low-level signal. The inverter 14 inverts the PWM signal from the control circuit 104 and outputs it to a control terminal of the switching element 13. Upon inputting a high-level signal, the switching element 13 turns on, while it turns off on inputting a low-level signal. As the switching elements 12, 13, for example, an FET can be used.

The above described elements form a synchronous-rectification type bi-directional DC/DC voltage converter. The bi-directional voltage converter 103a functions as a step-down type bi-directional voltage converter. In such a method as described below, it drops the fuel cell 101's output voltage 10 V to the secondary battery 102's output voltage 6 to 8.4 V.

The control circuit 104 outputs a PWM signal (see FIG. 3) which has a duty ratio Dt to the bi-directional voltage converter 103a. Then, it outputs the PWM signal at a high level for the period Ton, and shorts the switching element 12 and simultaneously opens the switching element 13. On the other hand, the control circuit 104 outputs the PWM signal at a low level for a period Toff, and opens the switching element 12 and simultaneously shorts the switching element 13. If the switching elements 12, 13 are operated in this way, then a voltage V1 (on the left side) of the fuel cell 101, an output voltage V2 (on the right side) of the secondary battery 102 and the PWM signal's duty ratio Dt establish the relation of the following expression (4).

$$V2/V1 = (1-Dt) \quad (4)$$

The control circuit 104 detects the voltage V1 of the fuel cell 101 and calculates the difference between this detection voltage and the target voltage 10 V. Using the expression (4), it calculates the PWM-signal duty ratio Dt so that this difference becomes zero. Then, it outputs a PWM signal which has this duty ratio Dt to the bi-directional voltage converter 103a.

As described above, in this embodiment, the voltage V1 of the fuel cell 101 is measured, the difference is calculated between it and the target voltage 10 V, and a duty ratio is determined so that this difference becomes zero. Therefore, the voltage V1 of the fuel cell 101 can be controlled so as to be fixed at 10 V.

In addition, likewise in this embodiment, as described using FIG. 4, irrespective of the relation in terms of greatness between an electric current Io generated by the fuel cell 101, an electric current Ic consumed by the load apparatus 600 and an electric current Is to the secondary battery 102, the output voltage of the fuel cell 101 becomes constant. Each electric current satisfies the following expression (5), which is the same as the first embodiment.

$$Io = Ic + Is \quad (5)$$

As described above, in this embodiment alike, there are cases where an electric current flows into the bi-directional voltage converter 103a from the side (i.e., the V1 side) of the fuel cell 101, and an electric current is supplied to the side (i.e., the V1 side) of the fuel cell 101 from the bi-directional voltage converter 103a. In either case, using the step-down type bi-directional voltage converter 103a which has the circuit configuration shown in FIG. 5, the voltage V1 of the fuel cell 101 can be controlled so as to be kept constant. As a result, electric power is stably supplied to the load apparatus 600. Therefore, even if the load apparatus 600's load temporally fluctuates sharply, electric power can be supplied from the fuel cell 101. This makes it possible to supply electric power from the fuel cell 101 to the load apparatus 600 which undergoes a sharp load fluctuation.

Third Embodiment

Figure 6:
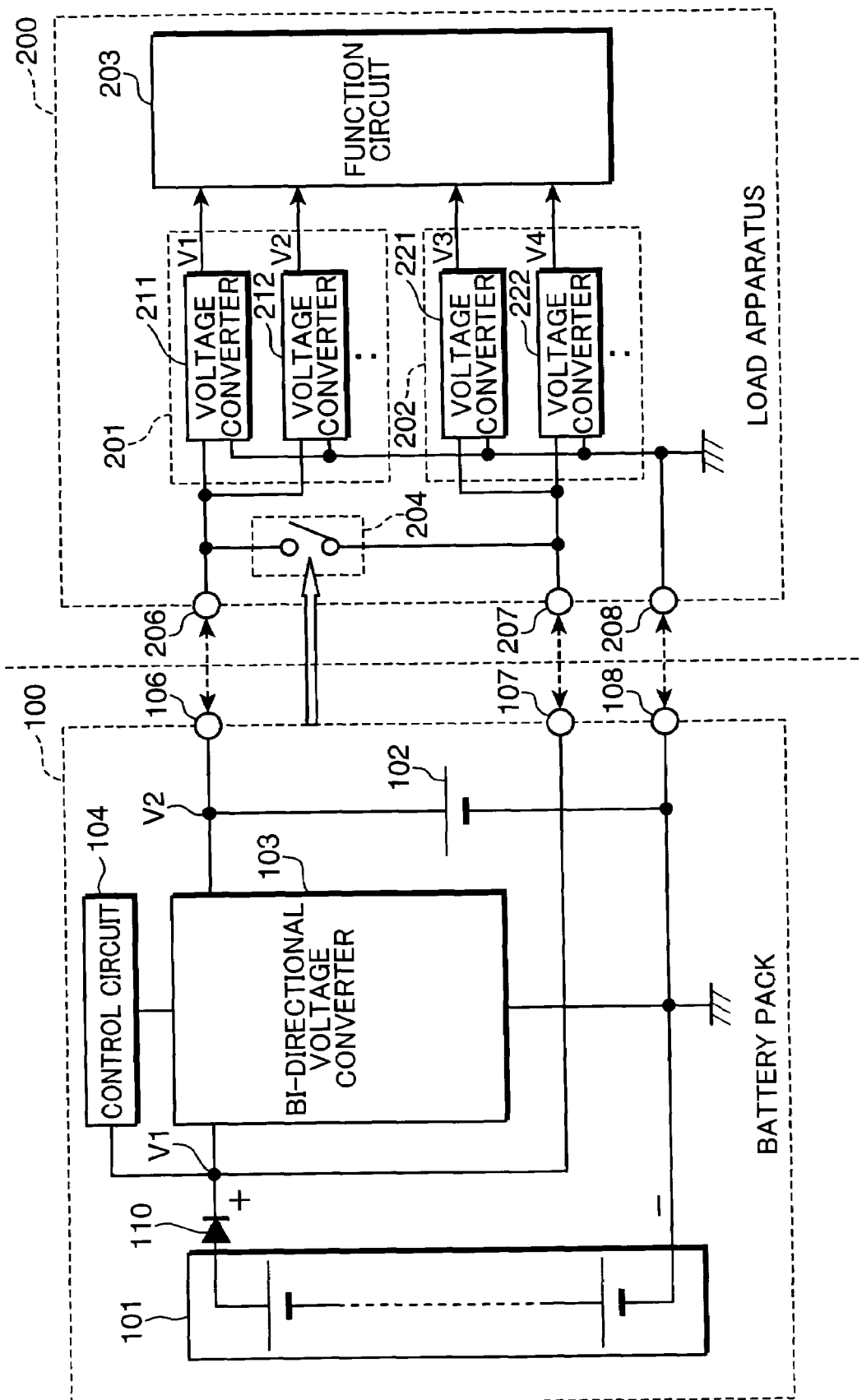
FIG. 6 is a block diagram, showing the configuration of electronic equipment according to a third embodiment of the present invention.

Next, a description will be given about electronic equipment according to a third embodiment of the present invention. FIG. 6 is a block diagram, showing the configuration of the electronic equipment according to the third embodiment.

The electronic equipment shown in FIG. 6 includes a battery pack 100 and a load apparatus 200. The battery pack 100 is provided with a fuel cell 101, a secondary battery 102, a bi-directional voltage converter 103, a control circuit 104, a rectifying element 110, a positive terminal 106 of the secondary battery 102, a positive terminal 107 of the fuel cell 101, and a common ground terminal 108 of the secondary battery 102 and the fuel cell 101.

Similarly to the first embodiment, the bi-directional voltage converter 103 is formed by the step-up type bi-directional voltage converter 103 shown in FIG. 2. It boosts the fuel cell 101's output voltage 2.4 V to the secondary battery's output voltage 6 to 8.4 V. The control circuit 104 measures the voltage V1 of the fuel cell 101, calculates the difference between it and the target voltage 2.4 V, and determines the duty ratio of a PWM signal so that this difference becomes zero. Thereby, it controls the voltage V1 of the fuel cell 101 so that it is kept constant at 2.4 V.

The load apparatus 200 includes: a first voltage-converter group 201 and a second voltage-converter group 202 which are allocated a plurality of voltage converters according to their output-voltage heights; a function circuit 203 which executes a function targeted by the load apparatus 200; a positive terminal 206 of the first voltage-converter group 201 which is connected to the positive terminal 106 of the secondary battery 102; a positive terminal 207 of the second voltage-converter group 202 which is connected to the positive terminal 107 of the fuel cell 101; a common ground terminal 208 of the first voltage-converter group 201 and the second voltage-converter group 202 which is connected to the common ground terminal 108 of the secondary battery 102 and the fuel cell 101; and a switch 204 which connects or disconnects the circuit of the positive terminal 206 of the first voltage-converter group 201 and the positive terminal 207 of the second voltage-converter group 202.

The first voltage-converter group 201 is provided with a voltage converter 211 and a voltage converter 212. The voltage converter 211's output voltage is 12 V and the voltage converter 212's output voltage is 10 V. The second voltage-converter group 202 is provided with a voltage converter 221 and a voltage converter 222. The voltage converter 221's output voltage is 1.5 V and the voltage converter 222's output voltage is 1.25 V. Incidentally, the number of voltage converters which are included in each of the first and second voltage-converter groups 201, 202 is not limited especially to the above described example. It may also be one, or three or above. Besides, in this embodiment, a single function circuit is used, but the present invention is not limited especially to this example. Several function circuits may also be used, and each function circuit can also be supplied, not with all voltages from all voltage converters, but with different voltages from one or more predetermined voltage converters.

In this embodiment, the output voltage of the fuel cell 101 is set to be lower than the output voltage of the secondary battery 102. In the same was as the first embodiment, the step-up type bi-directional voltage converter 103 shown in FIG. 2 is used as the bi-directional voltage converter 103. The control circuit 104 adjusts the duty ratio of a PWM signal which is applied to the step-up type bi-directional voltage converter 103, so that the fuel cell 101's output voltage becomes 2.4 V.

When the electric power generated by the fuel cell 101 is small at its start time, when the electric power consumed by the second voltage-converter group 202 is large, or at another such time, the electric power generated by the fuel cell 101 is smaller than the electric power consumed by the load apparatus 200. In this case, the bi-directional voltage converter 103 supplies electric power from the secondary battery 102 to the side of the fuel cell 101. Thereby, the voltage at both ends of the fuel cell 101 is kept constant at 2.4 V. This voltage is applied to the second voltage-converter group 202, so that electric power can be supplied.

If the quantity of fuel supplied to the fuel cell 101 is increased and it generates a larger amount of electric power, then with keeping constant the voltage at both ends of the fuel cell 101, the electric power of the fuel cell 101 is supplied to the secondary battery 102. In other words, irrespective of the relation in terms of greatness between the electric power generated by the fuel cell 101 and the electric power consumed by the second voltage-converter group 202, the voltage at both ends of the fuel cell 101 is kept constant.

Hence, in this embodiment, the voltage converters 221, 222 of 1.5 V, 1.25 V operate by receiving a voltage of 2.4 V from the fuel cell 101. On the other hand, the voltage converters 211, 212 of 12 V, 10 V operate by receiving a voltage of 6 to 8.4 V from the secondary battery 102.

Figure 12:
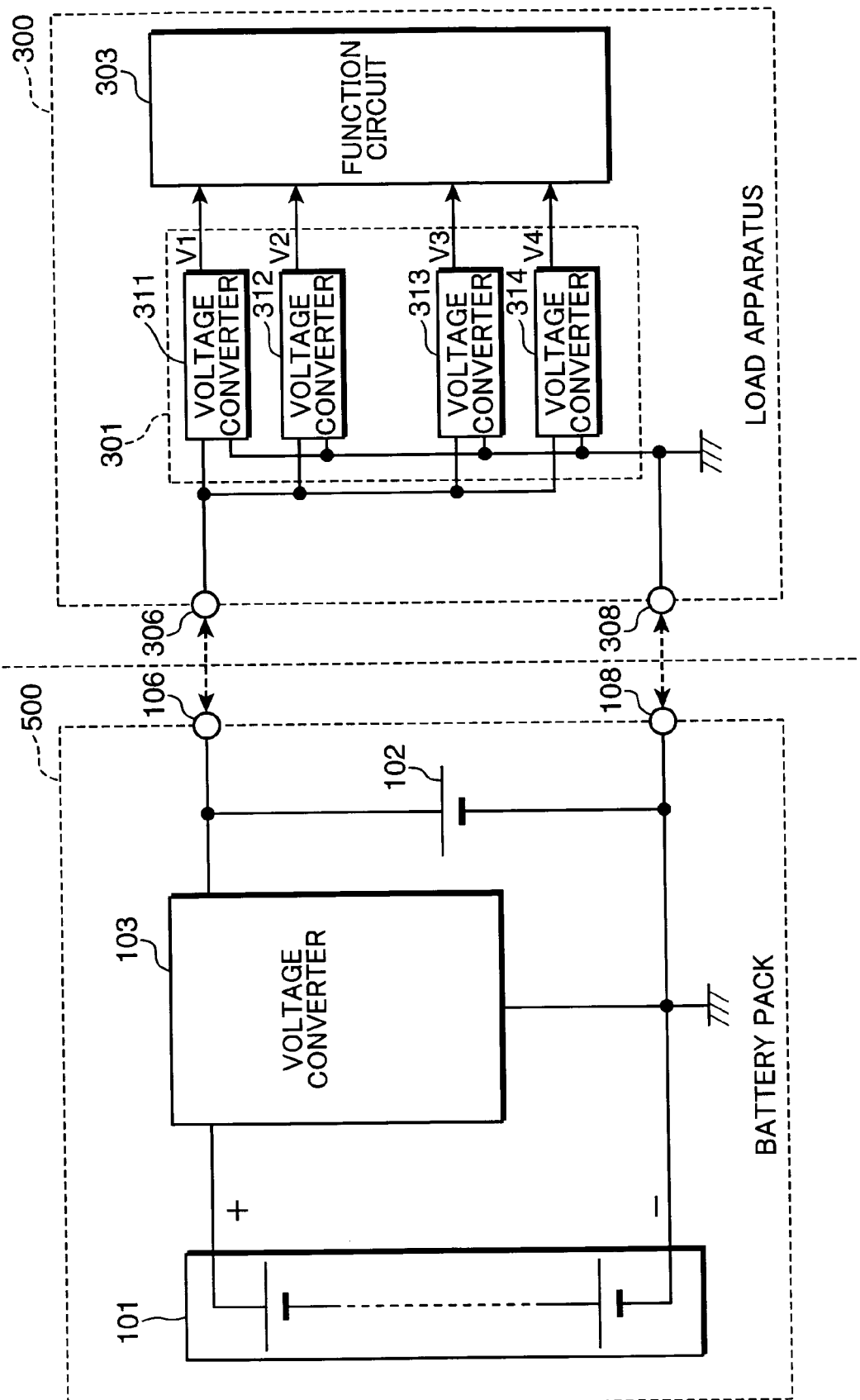
FIG. 12 is a block diagram, showing conventional electronic equipment in which a battery pack provided with a fuel cell is used.

Therefore, in this embodiment, an inefficient voltage conversion can be evaded, compared with the prior art of FIG. 12 which requires that the output voltage 2.4 V of the fuel cell 101 be stepped up to the output voltage 6 to 8.4 V of the secondary battery 102, and then, this voltage be stepped down to 1.25 V and 1.5 V by the second voltage-converter group 202. Therefore, a power loss caused by a voltage conversion can be reduced.

In addition, likewise in this embodiment, as described using FIG. 4, irrespective of the relation in terms of greatness between an electric current Io generated by the fuel cell 101, an electric current Ic consumed by the load apparatus 200 and an electric current Is to the secondary battery 102, the output voltage of the fuel cell 101 becomes constant. Hence, the following expression (6) is established, which is the same as the first and second embodiments.

$$Io = Ic + Is \qquad (6)$$

In this way, there are cases where an electric current flows into the bi-directional voltage converter 103 from the side (i.e., the V1 side) of the fuel cell 101, and an electric current is supplied to the side (i.e., the V1 side) of the fuel cell 101 from the bi-directional voltage converter 103. In either case, using the step-up type bi-directional voltage converter 103 which has the circuit configuration shown in FIG. 2, the voltage V1 of the fuel cell 101 can be controlled so as to be kept constant. As a result, electric power is stably supplied to the load apparatus 200. Therefore, even if the load apparatus 200's load temporally fluctuates sharply, electric power can be supplied from the fuel cell 101. This makes it possible to supply electric power from the fuel cell 101 to the load apparatus 200 which undergoes a sharp load fluctuation.

Fourth Embodiment

Figure 7:
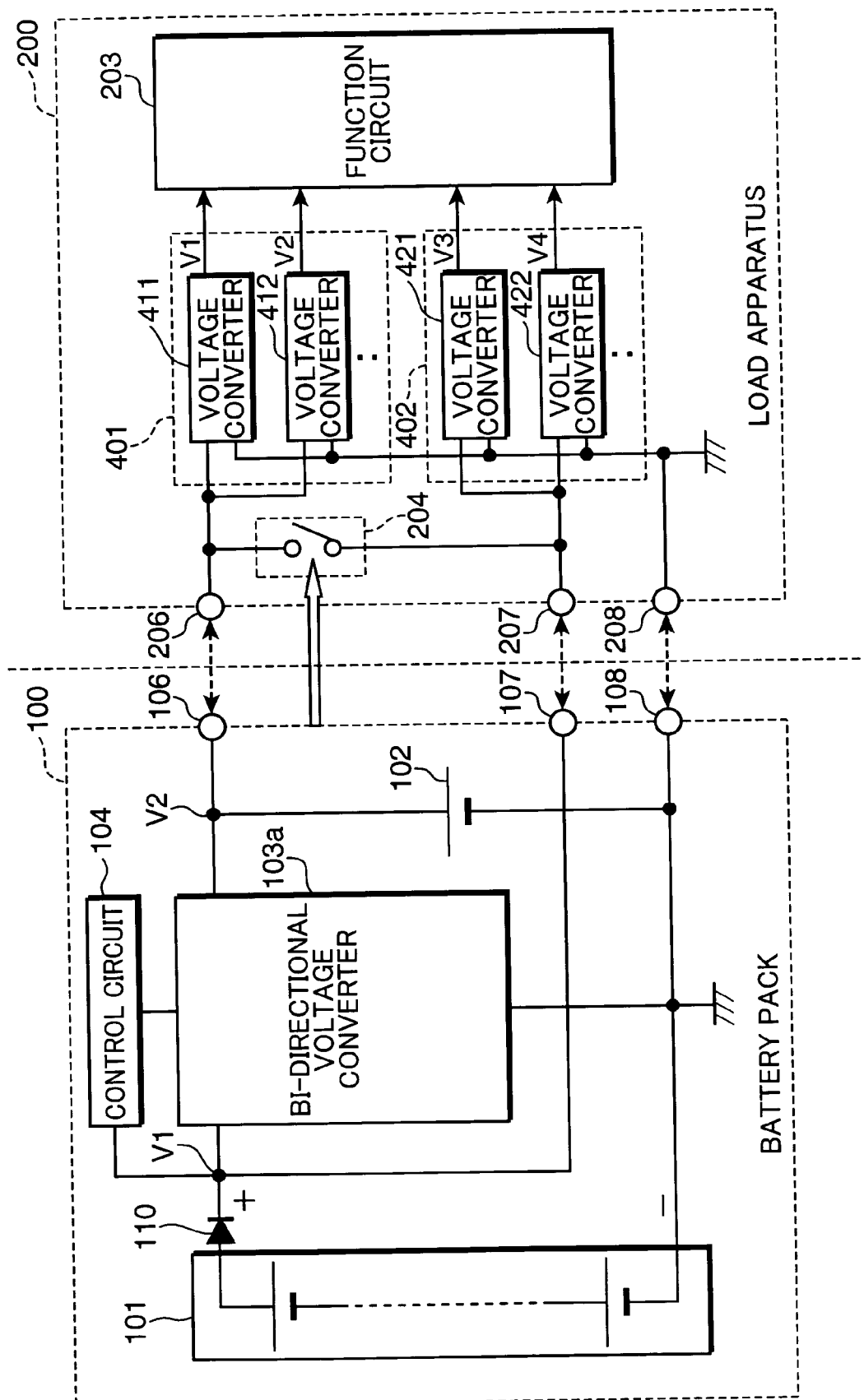
FIG. 7 is a block diagram, showing the configuration of electronic equipment according to a fourth embodiment of the present invention.

Next, a description will be given about electronic equipment according to a fourth embodiment of the present invention. FIG. 7 is a block diagram, showing the configuration of the electronic equipment according to the fourth embodiment. This embodiment is different from the third embodiment, in the following two points. First, step-down type voltage converters are used. The rest is that from among a plurality of voltage converters, the ones whose output voltages are lower are sorted out and assigned to a first voltage-converter group, and the ones whose output voltages are higher are sorted out and assigned to a second voltage-converter group. In the other respects, it is the same as the third embodiment, and thus, their detailed description is omitted.

The electronic equipment shown in FIG. 7 includes a battery pack 100 and a load apparatus 200. The battery pack 100 is provided with a fuel cell 101, a secondary battery 102, a bi-directional voltage converter 103a, a control circuit 104, a rectifying element 110, a positive terminal 106 of the secondary battery 102, a positive terminal 107 of the fuel cell 101, and a common ground terminal 108 of the secondary battery 102 and the fuel cell 101.

Similarly to the second embodiment, the bi-directional voltage converter 103a is formed by the step-down type bi-directional voltage converter 103a shown in FIG. 5. It drops the fuel cell 101's output voltage 10 V to the secondary battery's output voltage 6 to 8.4 V. The control circuit 104 measures the voltage V1 of the fuel cell 101, calculates the difference between it and the target voltage 10 V, and determines the duty ratio of a PWM signal so that this difference becomes zero. Thereby, it controls the voltage V1 of the fuel cell 101 so that it is kept constant at 10 V.

The load apparatus 200 includes: a first voltage-converter group 401 and a second voltage-converter group 402 which are allocated a plurality of voltage converters according to their output-voltage heights; a function circuit 203 which executes a function targeted by the load apparatus 200; a positive terminal 206 of the first voltage-converter group 401 which is connected to the positive terminal 106 of the secondary battery 102; a positive terminal 207 of the second voltage-converter group 402 which is connected to the positive terminal 107 of the fuel cell 101; a common ground terminal 208 of the first voltage-converter group 401 and the second voltage-converter group 402 which is connected to the common ground terminal 108 of the secondary battery 102 and the fuel cell 101; a switch 204 which connects or disconnects the positive terminal 206 of the first voltage-converter group 401 and the positive terminal 207 of the second voltage-converter group 402.

The first voltage-converter group 401 is provided with a voltage converter 411 and a voltage converter 412. The voltage converter 411's output voltage is 1.5 V and the voltage converter 412's output voltage is 1.25 V. The second voltage-converter group 402 is provided with a voltage converter 421 and a voltage converter 422. The voltage converter 421's output voltage is 12 V and the voltage converter 422's output voltage is 10 V. Incidentally, the number of voltage converters which are included in each of the first and second voltage-converter groups 401, 402 is not limited especially to the above described example. It may also be one, or three or above. Besides, in this embodiment, a single function circuit is used, but the present invention is not limited especially to this example. Several function circuits may also be used, and each function circuit can also be supplied, not with all voltages from all voltage converters, but with different voltages from one or more predetermined voltage converters.

In this embodiment, the output voltage of the fuel cell 101 is set to be higher than the output voltage of the secondary battery 102. In the same was as the second embodiment, the step-down type bi-directional voltage converter 103a shown in FIG. 5 is used as the bi-directional voltage converter 103a. The control circuit 104 adjusts the duty ratio of a PWM signal which is applied to the step-down type bi-directional voltage converter 103a, so that the fuel cell 101's output voltage becomes 10 V.

When the electric power generated by the fuel cell 101 is small at its start time, when the electric power consumed by the second voltage-converter group 402 is large, or at another such time, the electric power generated by the fuel cell 101 is smaller than the electric power consumed by the load apparatus 200. In this case, the bi-directional voltage converter 103a supplies electric power from the secondary battery 102 to the side of the fuel cell 101. Thereby, the voltage at both ends of the fuel cell 101 is kept constant at 10 V. This voltage is applied to the second voltage-converter group 402, so that electric power can be supplied.

If the electric power generated by the fuel cell 101 is increased, then with keeping constant the voltage at both ends of the fuel cell 101, the electric power of the fuel cell 101 is supplied to the secondary battery 102. In other words, irrespective of the relation in terms of greatness between the electric power generated by the fuel cell 101 and the electric power consumed by the second voltage-converter group 402, the voltage at both ends of the fuel cell 101 is kept constant. These points are the same as the first to third embodiments.

Hence, in this embodiment, the voltage converters 421, 422 of 12 V, 10 V operate by receiving a voltage of 10 V from the fuel cell 101. On the other hand, the voltage converters 411, 412 of 1.5 V, 1.25 V operate by receiving a voltage of 6 to 8.4 V from the secondary battery 102.

Therefore, in this embodiment, compared with the prior art of FIG. 12, voltage step-down ratios in the voltage converters 421, 422 of 12 V, 10 V approach to one, so that a power loss can be reduced. Especially, in terms of the 12V voltage converter 421, an inefficient voltage conversion can be evaded, like stepping down the output voltage 10 V of the fuel cell 101 to the output voltage 6 to 8.4 V of the secondary battery 102, and using the 12V voltage converter, stepping up this voltage to 12 V. Therefore, a power loss caused by a voltage conversion can be reduced.

In addition, likewise in this embodiment, as described using FIG. 4, irrespective of the relation in terms of greatness between an electric current Io generated by the fuel cell 101, an electric current Ic consumed by the load apparatus 200 and an electric current Is to the secondary battery 102, the output voltage of the fuel cell 101 becomes constant. Hence, the following expression (7) is established, which is the same as the first to third embodiments.

$$Io=Ic+Is \qquad (7)$$

In this way, there are cases where an electric current flows into the bi-directional voltage converter 103a from the side (i.e., the V1 side) of the fuel cell 101, and an electric current is supplied to the side (i.e., the V1 side) of the fuel cell 101 from the bi-directional voltage converter 103a. In either case, using the step-down type bi-directional voltage converter 103a which has the circuit configuration shown in FIG. 5, the voltage V1 of the fuel cell 101 can be controlled so as to be kept constant. As a result, electric power is stably supplied to the load apparatus 200. Therefore, even if the load apparatus 200's load temporally fluctuates sharply, electric power can be supplied from the fuel cell 101. This makes it possible to supply electric power from the fuel cell 101 to the load apparatus 200 which undergoes a sharp load fluctuation.

Fifth Embodiment

Figure 8:
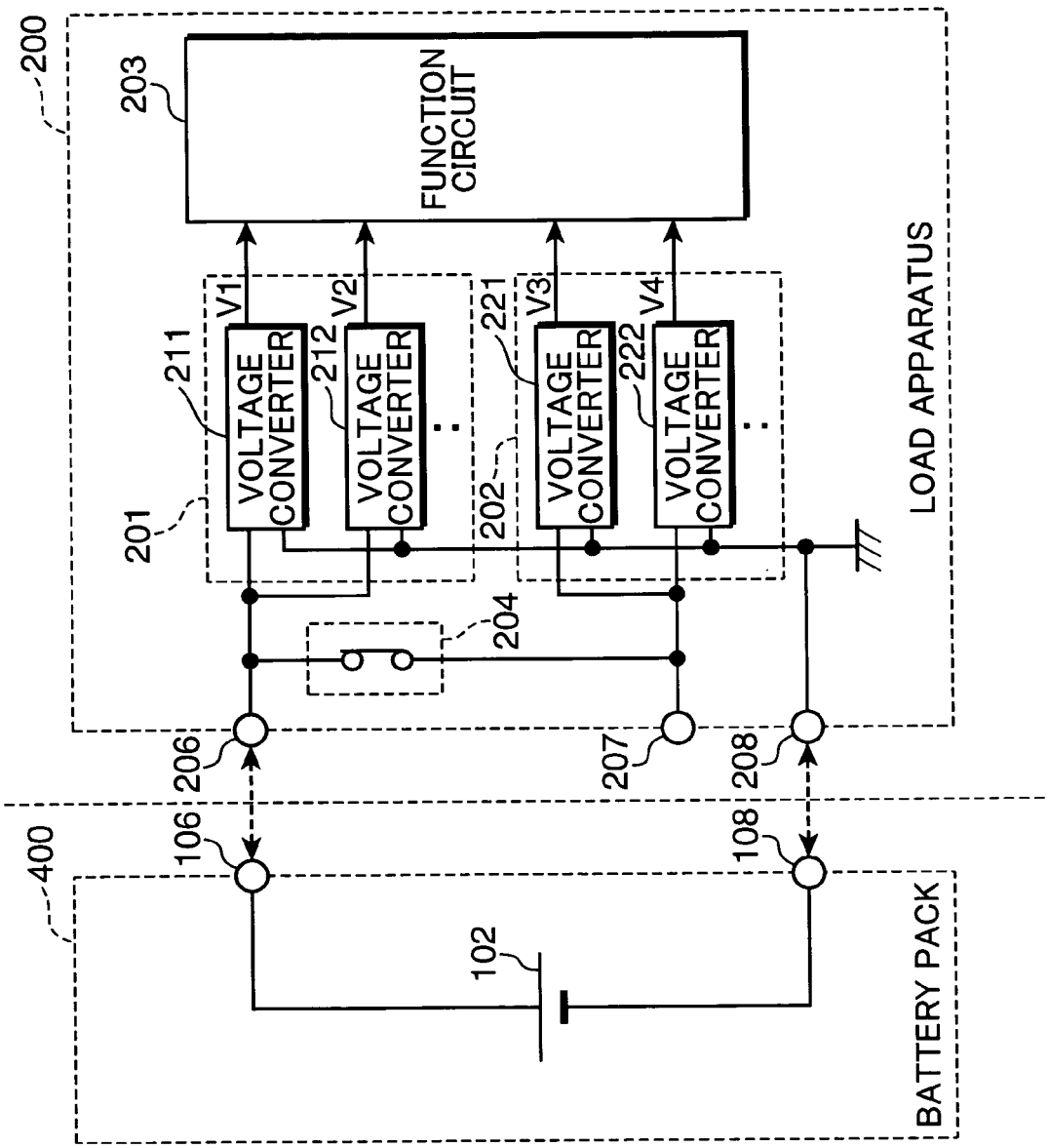
FIG. 8 is a block diagram, showing the configuration of electronic equipment according to a fifth embodiment of the present invention.
Figure 10:
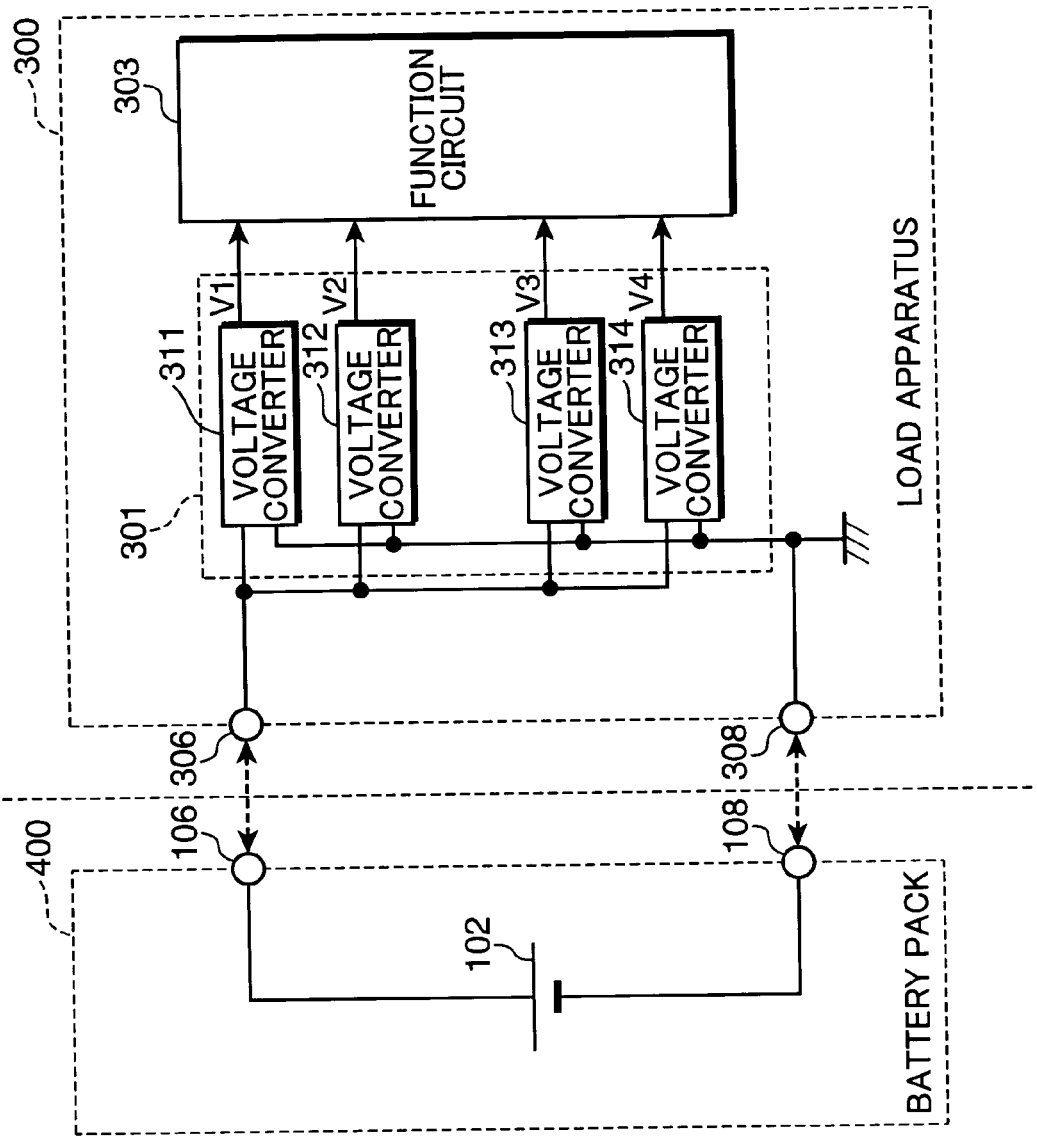
FIG. 10 is a block diagram, showing conventional electronic equipment such as a notebook personal computer on the market.
Figure 11:
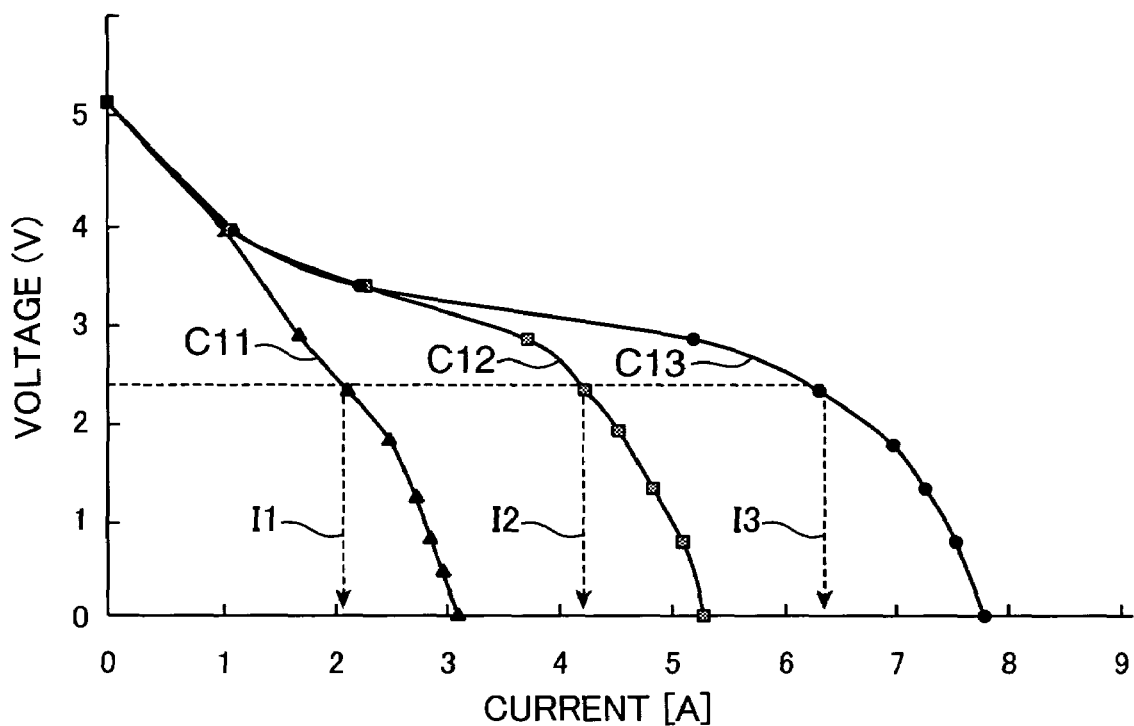
FIG. 11 is a graphical representation, showing current-voltage characteristics according to the supply of fuel in a fuel cell formed by connecting six cells in series.

Next, a description will be given about electronic equipment according to a fifth embodiment of the present invention. FIG. 8 is a block diagram, showing the configuration of the electronic equipment according to the fifth embodiment. In this embodiment, the electronic equipment is configured by connecting the conventional battery pack 400 shown in FIG. 10 to the load apparatus 200 shown in FIG. 6. For the load apparatus 200 shown in FIG. 6, the conventional battery pack 400 provided with only the two output terminals 106, 108 can be used. This will be described below.

The load apparatus 200 includes a switch 204 which connects or disconnects the positive terminal 206 of the first voltage-converter group 201 and the positive terminal 207 of the second voltage-converter group 202. The switch 204 is designed to ordinarily short-circuit, so that when the conventional battery pack 400 is attached, it can short the circuit. Therefore, if the conventional battery pack 400 provided only with the two output terminals 106, 108 of the secondary battery 102 is attached to the load apparatus 200, the switch 204 makes a short circuit. Thereby, electric power is supplied from the secondary battery 102 to both the first voltage-converter group 201 and the second voltage-converter group 202. This prompts the function circuit 203 to operate.

On the other hand, if the battery pack 100 which includes the three output terminals 106 to 108 shown in FIG. 6 is attached to the load apparatus 200, then in order to operate the battery pack 100 and the load apparatus 200, preferably, the battery pack 100 should have a mechanism for turning off the switch 204 mechanically. In this case, if the battery pack 100 with the three output terminals 106 to 108 is attached, the switch 204 is opened. This enables the battery pack 100 and the load apparatus 200 to operate in the same way as the third embodiment.

For example, as the switch 204, a leaf switch or a mechanical switch which turns on or off when its two connection leaves come into or out of mechanical contact may be used, as well as a convex portion can be formed in the battery pack 100. In this case, if the battery pack 100 is attached to the load apparatus 200, this convex portion presses one of the connection leaves of the switch 204 so that it can be opened.

In addition, the same function may also be realized based on an electric signal. For example, as the switch 204, an FET or the like can be used which is turned on or off according to a control signal. In this case, if the battery pack 100 is attached to the load apparatus 200, then from the battery pack 100, a control signal for turning off the switch 204 is outputted to the switch 204.

Sixth Embodiment

Figure 9:
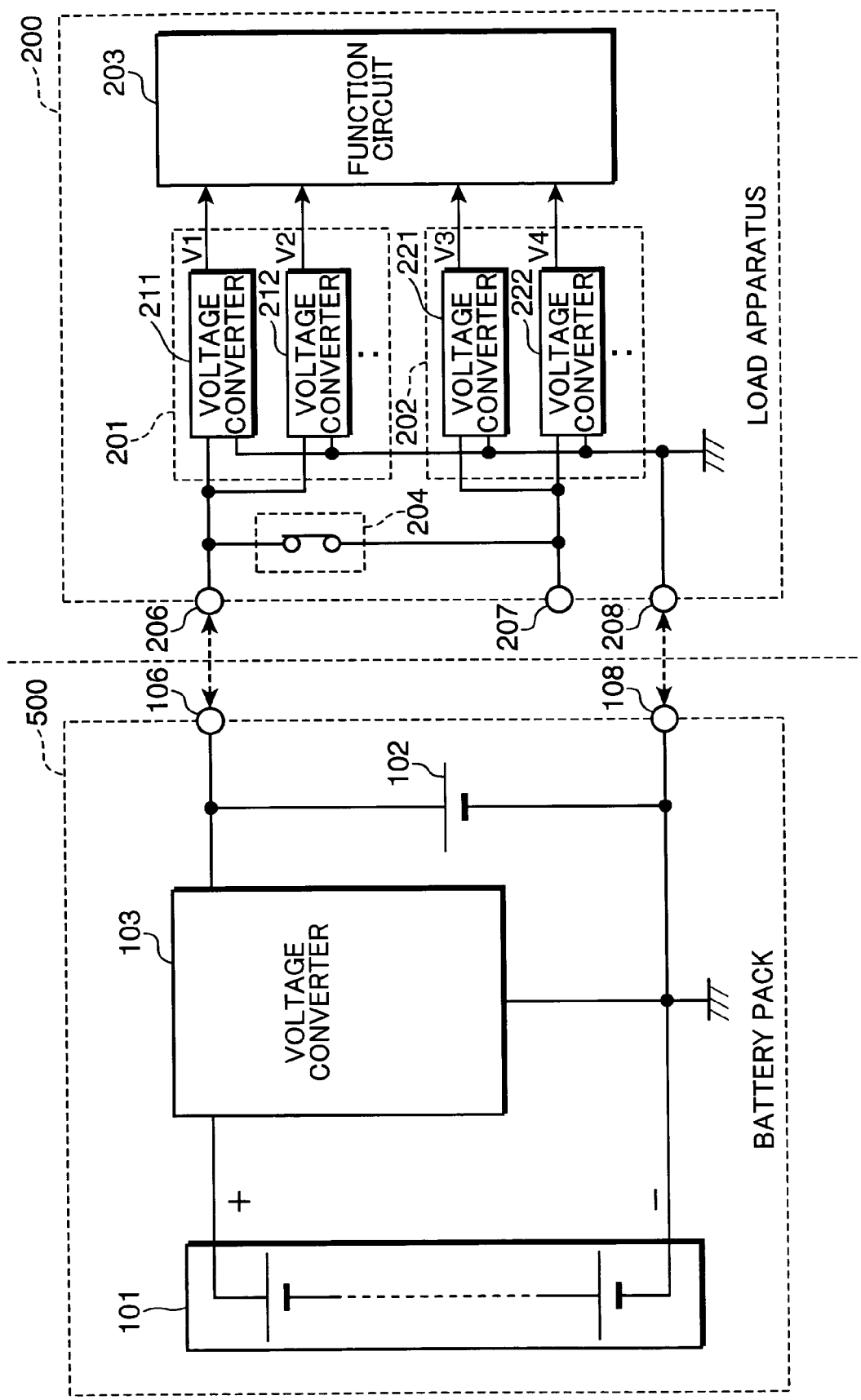
FIG. 9 is a block diagram, showing the configuration of electronic equipment according to a sixth embodiment of the present invention.

Next, a description will be given about electronic equipment according to a sixth embodiment of the present invention. FIG. 9 is a block diagram, showing the configuration of the electronic equipment according to the sixth embodiment. In this embodiment, the electronic equipment is configured by connecting the conventional battery pack 500 made up of the fuel cell 101 and the secondary battery 102 which is shown in FIG. 12 to the load apparatus 200 shown in FIG. 6. For the load apparatus 200 shown in FIG. 6, the conventional battery pack 500 provided with only the two output terminals 106, 108 can be used. This will be described below.

If the conventional battery pack 500 provided only with the two output terminals 106, 108 of the secondary battery 102 is attached to the load apparatus 200, the switch 204 is configured in the same way as the fifth embodiment and makes a short circuit. In this case alike, similarly to the fifth embodiment, electric power is supplied from the secondary battery 102 to both the first voltage-converter group 201 and the second voltage-converter group 202. This prompts the function circuit 203 to operate.

Incidentally, in the same way, the configuration of the load apparatus 200 and the battery pack 100 according to the above described fifth and sixth embodiments can also be applied to the load apparatus 200 and the battery pack 100 according to the fourth embodiment. By doing that, the same advantages can be obtained.

As described so far, an electronic equipment according to the present invention, comprising a power-source section and a load apparatus, wherein: the power-source section includes a fuel cell, a secondary battery, and a bi-directional voltage converter which is connected between the fuel cell and the secondary battery, and converts bi-directionally an output voltage of the fuel cell and an output voltage of the secondary battery; and the load apparatus is connected in parallel to the fuel cell.

In this electronic equipment, the voltage outputted from the fuel cell is adjusted to a constant voltage by the bi-directional voltage converter. At this time, the bi-directional voltage converter is used. Thereby, even if the electric current consumed by the load apparatus connected to the fuel cell is sharply increased so that it consumes electric power beyond the one generated by the fuel cell, or even if the electric power generated by the fuel cell cannot be quickly raised when the fuel cell starts to operate, when the flow rate of fuel is increased and at another such time so that it is smaller than the electric power consumed in the load apparatus, in short, even if the electric power generated by the fuel cell is smaller than the electric power consumed in the load apparatus, then the bi-directional voltage converter supplies electric power from the secondary battery to the output side of the fuel cell and keeps the voltage constant at both ends of the fuel cell. Thereby, electric power can be stably supplied to the load apparatus. Hence, even if the load apparatus undergoes a sharp temporal fluctuation in its load, it can receive a power supply from the fuel cell.

It is preferable that: the load apparatus include a first voltage converter which outputs a voltage closer to an output voltage of the secondary battery than an output voltage of the fuel cell, a second voltage converter which outputs a voltage closer to the output voltage of the fuel cell than the output voltage of the secondary battery, and a function circuit which executes a function of the load apparatus, the function circuit being supplied with electric power from the first and second voltage converters; and the first voltage converter be connected in parallel to the secondary battery; and the second voltage converter be connected in parallel to the fuel cell.

In this case, the first voltage converter which outputs a voltage closer to an output voltage of the secondary battery than an output voltage of the fuel cell is connected in parallel to the secondary battery. Then, the second voltage converter which outputs a voltage closer to the output voltage of the fuel cell than the output voltage of the secondary battery is connected in parallel to the fuel cell. Therefore, in the first and second voltage converters, their voltage step-up ratios or voltage step-down ratios can be brought as close to one as possible. This makes it possible to evade using electric power by boosting the voltage inside of the power-source section and thereafter dropping the voltage using the first and second voltage converters. Or, it helps evade using electric power by dropping the voltage inside of the power-source section and thereafter boosting the voltage using the first and second voltage converters. Hence, in the first and second voltage converters, a power loss can be reduced, thus offering electronic equipment whose energy utilization efficiency is improved. Besides, such electronic equipment can also be used continuously for a longer time than any conventional one.

Preferably: the power-source section should include a battery pack attachable to and detachable from the load apparatus; the load apparatus should further include a switch which connects or disconnects an input of the first voltage converter and an input of the second voltage converter; and the switch is opened only when the battery pack is attached to the load apparatus, and is closed otherwise.

In this case, when a battery pack which includes the fuel cell connected in parallel to the above described second voltage converter is not attached, an input of the first converter and an input of the second voltage converter are short-circuited. Thereby, the first and second voltage converters can be considered to be a single voltage-converter group, as is the case with the electronic equipment according to a prior art. Even if the above described battery pack which includes the fuel cell connected in parallel to the second voltage converter is replaced with a conventional battery pack which includes no fuel cell or a conventional battery pack which includes a fuel cell, they are kept interchangeable so that the load apparatus can be used.

It is preferable that: the first voltage converter include a plurality of first voltage converters which output a voltage closer to the output voltage of the secondary battery than the output voltage of the fuel cell; the second voltage converter include a plurality of second voltage converters which output a voltage closer to the output voltage of the fuel cell than the output voltage of the secondary battery; the plurality of first voltage converters be connected in parallel to the secondary battery; and the plurality of second voltage converters be connected in parallel to the fuel cell.

In this case, the plurality of voltage converters are classified into the first and second voltage-converter groups, so that the voltage step-up ratios or voltage step-down ratios of the voltage converters included in each group can be brought as close to one as possible. This makes it possible to evade using electric power by boosting the voltage inside of the power-source section and thereafter dropping the voltage using the first and second voltage-converter groups. Or, it helps evade using electric power by dropping the voltage inside of the power-source section and thereafter boosting the voltage using the first and second voltage-converter groups. Hence, in a large number of such voltage converters, a power loss can be decreased, thus making the energy utilization efficiency higher.

Preferably, if an electric current generated by the fuel cell is smaller than an electric current consumed by the load apparatus, the bi-directional voltage converter should supply the shortage of the electric current consumed by the load apparatus to the load apparatus from the secondary battery, and if the electric current generated by the fuel cell is larger than the electric current consumed by the load apparatus, the bi-directional voltage converter should supply the excess of the electric current generated by the fuel cell to the secondary battery.

In this case, if an electric current generated by the fuel cell is smaller than an electric current consumed by the load apparatus, the shortage of the electric current consumed by the load apparatus is supplied to the load apparatus from the secondary battery. Therefore, electric power can be supplied to the load apparatus with keeping the voltage constant at both ends of the fuel cell. On the other hand, if an electric current generated by the fuel cell is larger than an electric current consumed by the load apparatus, the excess electric current generated by the fuel cell is supplied to the secondary battery. Therefore, the fuel cell's excess electric power can be stored in the secondary battery, thus using the fuel cell's power effectively.

It is preferable that: an output voltage of the fuel cell be lower than an output voltage of the secondary battery; the bi-directional voltage converter include a step-up type bi-directional voltage converter which steps up the output voltage of the fuel cell to the output voltage of the secondary battery; and the power-source section further include a control circuit which detects the output voltage of the fuel cell and controls the step-up type bi-directional voltage converter so that the output voltage of the fuel cell is constant.

In this case, the output voltage of the fuel cell is detected and the step-up type bi-directional voltage converter is controlled so that the output voltage of the fuel cell is constant. Therefore, if the output voltage of the fuel cell is lower than the output voltage of the secondary battery, electric power can be supplied to the load apparatus with keeping the voltage constant at both ends of the fuel cell. Simultaneously, the fuel cell's excess electric power can be stored in the secondary battery, thus using the fuel cell's power effectively.

Preferably: the step-up type bi-directional voltage converter should include a synchronous-rectification type bi-directional DC/DC voltage converter which satisfies the relation of $V2/V1=1/(1-Dt)$ if the voltage on the side of the fuel cell is $V1$, the voltage on the side of the secondary battery is $V2$ and the duty ratio of a PWM signal is $Dt$; and the control circuit should control the duty ratio $Dt$ of the PWM signal so that the output voltage of the fuel cell is constant.

In this case, the duty ratio of the PWM signal is controlled so that the output voltage of the fuel cell is constant. Therefore, if the output voltage of the fuel cell is lower than the output voltage of the secondary battery, then using such a simple control method of changing the duty ratio of the PWM signal, electric power can be supplied to the load apparatus with keeping the voltage constant at both ends of the fuel cell. Simultaneously, the fuel cell's excess electric power can be stored in the secondary battery, thus using the fuel cell's power effectively.

Furthermore, an output voltage of the fuel cell may be higher than an output voltage of the secondary battery; the bi-directional voltage converter may include a step-down type bi-directional voltage converter which steps down the output voltage of the fuel cell to the output voltage of the secondary battery; and the power-source section further may include a control circuit which detects the output voltage of the fuel cell and controls the step-down type bi-directional voltage converter so that the output voltage of the fuel cell is constant.

In this case, the output voltage of the fuel cell is detected and the step-down type bi-directional voltage converter is controlled so that the output voltage of the fuel cell is constant. Therefore, if the output voltage of the fuel cell is higher than the output voltage of the secondary battery, electric power can be supplied to the load apparatus with keeping the voltage constant at both ends of the fuel cell. Simultaneously, the fuel cell's excess electric power can be stored in the secondary battery, thus using the fuel cell's power effectively.

It is preferable that: the step-down type bi-directional voltage converter include a synchronous-rectification type bi-directional DC/DC voltage converter which satisfies the relation of $V2/V1=(1-Dt)$ if the voltage on the side of the fuel cell is $V1$, the voltage on the side of the secondary battery is $V2$ and the duty ratio of a PWM signal is $Dt$; and the control circuit control the duty ratio $Dt$ of the PWM signal so that the output voltage of the fuel cell is constant.

In this case, the duty ratio of the PWM signal is controlled so that the output voltage of the fuel cell is constant. Therefore, if the output voltage of the fuel cell is higher than the output voltage of the secondary battery, then using such a simple control method of changing the duty ratio of the PWM signal, electric power can be supplied to the load apparatus with keeping the voltage constant at both ends of the fuel cell. Simultaneously, the fuel cell's excess electric power can be stored in the secondary battery, thus using the fuel cell's power effectively.

Preferably, the fuel cell should include a methanol direct-supply fuel cell. In this case, the size of the fuel cell becomes smaller, so that the power-source section can also be smaller. This helps makes the electronic equipment smaller.

It is preferable that the secondary battery include an Li-ion cell. In this case, the size of the secondary battery becomes smaller, so that the power-source section can also be smaller. This helps makes the electronic equipment smaller.

Moreover, a battery pack according to the present invention, comprising: a fuel cell; a secondary battery; and a bi-directional voltage converter which is connected between the fuel cell and the secondary battery, and converts bi-directionally an output voltage of the fuel cell and an output voltage of the secondary battery.

If this battery pack is attached to the load apparatus, the voltage outputted from the fuel cell is adjusted to a constant voltage by the bi-directional voltage converter. At this time, the bi-directional voltage converter is used, and thus, even if the electric power generated by the fuel cell is smaller than the electric power consumed in the load apparatus, then the bi-directional voltage converter can supply electric power from the secondary battery to the output side of the fuel cell while keeping the voltage constant at both ends of the fuel cell. Thereby, electric power can be stably supplied to the load apparatus. Hence, even if the load apparatus undergoes a sharp temporal fluctuation in its load, it can receive a power supply from the fuel cell.

In addition, a load apparatus according to the present invention for which a battery pack including a fuel cell and a secondary battery is used, comprising: a first voltage converter which outputs a voltage closer to an output voltage of the secondary battery than an output voltage of the fuel cell; a second voltage converter which outputs a voltage closer to the output voltage of the fuel cell than the output voltage of the secondary battery; a function circuit which executes a function of the load apparatus, the function circuit being supplied with electric power from the first and second voltage converters; a first terminal for supplying electric power from the secondary battery to the first voltage converter; and a second terminal for supplying electric power from the fuel cell to the second voltage converter.

If a battery pack including a fuel cell and a secondary battery is attached to this load apparatus, using the first terminal, electric power is supplied from the secondary battery to the first voltage converter, and the first voltage converter outputs a voltage closer to the output voltage of the secondary battery than the output voltage of the fuel cell. Then, using the second terminal, electric power is supplied from the fuel cell to the second voltage converter, and the second voltage converter outputs a voltage closer to the output voltage of the fuel cell than the output voltage of the secondary battery. Therefore, in the first and second voltage converters, their voltage step-up ratios or voltage step-down ratios can be brought as close to one as possible. This makes it possible to evade using electric power by dropping its voltage after boosting it, or boosting the voltage after dropping it. Hence, in the voltage converters, a power loss can be reduced, thereby offering electronic equipment whose energy utilization efficiency is enhanced.

According to the present invention, in electronic equipment where a fuel cell and a secondary battery are used, from the fuel cell, electric power can be supplied to a function circuit whose load fluctuates sharply. At the same time, a wasteful voltage change, such as using electric power by dropping its voltage after boosting it, or boosting the voltage after dropping it, can be avoided. Thereby, an efficient voltage conversion can be realized, thus offering electronic equipment in which a power loss is reduced. Hence, it is useful for electronic equipment which requires a power source capable of outputting several voltages, such as a notebook PC and a cellular phone.

This application is based on Japanese patent application serial No. 2005-191413, filed in Japan Patent Office on Jun. 30, 2005, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. Electronic equipment, comprising a power-source section and a load apparatus, wherein:
   the power-source section includes,
   a fuel cell,
   a secondary battery, and
   a bi-directional voltage converter which is connected between the fuel cell and the secondary battery, and converts bi-directionally an output voltage of the fuel cell and an output voltage of the secondary battery,
   the load apparatus is connected in parallel to the fuel cell and is directly connected to the output of the bi-directional voltage converter on the side of the fuel cell; and
   when the electric power generated by the fuel cell is smaller than the electric power consumed in the load apparatus, the bi-directional voltage converter supplies electric power from the secondary battery to the output side of the fuel cell while keeping the voltage constant at both ends of the fuel cell.

2. The electronic equipment according to claim 1, wherein:
   the load apparatus includes,
   a first voltage converter which outputs a voltage closer to an output voltage of the secondary battery than an output voltage of the fuel cell,
   a second voltage converter which outputs a voltage closer to the output voltage of the fuel cell than the output voltage of the secondary battery, and
   a function circuit which executes a function of the load apparatus, the function circuit being supplied with electric power from the first and second voltage converters;
   and the first voltage converter is connected in parallel to the secondary battery; and
   the second voltage converter is connected in parallel to the fuel cell.

3. The electronic equipment according to claim 2, wherein:
   the power-source section includes a battery pack attachable to and detachable from the load apparatus;
   the load apparatus further includes a switch which connects or disconnects an input of the first voltage converter and an input of the second voltage converter; and
   the switch is opened only when the battery pack is attached to the load apparatus, and is closed otherwise.

4. The electronic equipment according to claim 2, wherein:
   the first voltage converter includes a plurality of first voltage converters which output a voltage closer to the output voltage of the secondary battery than the output voltage of the fuel cell;
   the second voltage converter includes a plurality of second voltage converters which output a voltage closer to the output voltage of the fuel cell than the output voltage of the secondary battery;
   the plurality of first voltage converters are connected in parallel to the secondary battery;
   and the plurality of second voltage converters are connected in parallel to the fuel cell.

5. The electronic equipment according to claim 1, wherein if an electric current generated by the fuel cell is smaller than an electric current consumed by the load apparatus, the bi-directional voltage converter supplies the shortage of the electric current consumed by the load apparatus to the load apparatus from the secondary battery, and if the electric current generated by the fuel cell is larger than the electric current consumed by the load apparatus, the bi-directional voltage converter supplies the excess of the electric current generated by the fuel cell to the secondary battery.

6. The electronic equipment according to claim 1, wherein:
an output voltage of the fuel cell is lower than an output voltage of the secondary battery;
the bi-directional voltage converter includes a step-up type bi-directional voltage converter which steps up the output voltage of the fuel cell to the output voltage of the secondary battery; and
the power-source section further includes a control circuit which detects the output voltage of the fuel cell and controls the step-up type bi-directional voltage converter so that the output voltage of the fuel cell is constant.

7. The electronic equipment according to claim 6, wherein:
the step-up type bi-directional voltage converter includes a synchronous-rectification type bi-directional DC/DC voltage converter which satisfies the relation of $V2/V1=1(1-Dt)$ if the voltage on the side of the fuel cell is V1, the voltage on the side of the secondary battery is V2 and the duty ratio of a PWM signal is Dt; and
the control circuit controls the duty ratio Dt of the PWM signal so that the output voltage of the fuel cell is constant.

8. The electronic equipment according to claim 1, wherein:
an output voltage of the fuel cell is higher than an output voltage of the secondary battery;
the bi-directional voltage converter includes a step-down type bi-directional voltage converter which steps down the output voltage of the fuel cell to the output voltage of the secondary battery; and
the power-source section further includes a control circuit which detects the output voltage of the fuel cell and controls the step-down type bi-directional voltage converter so that the output voltage of the fuel cell is constant.

9. The electronic equipment according to claim 8, wherein:
the step-down type bi-directional voltage converter includes a synchronous-rectification type bi-directional DC/DC voltage converter which satisfies the relation of $V2/V1=(1-Dt)$ if the voltage on the side of the fuel cell is V1, the voltage on the side of the secondary battery is V2 and the duty ratio of a PWM signal is Dt; and
the control circuit controls the duty ratio Dt of the PWM signal so that the output voltage of the fuel cell is constant.

10. The electronic equipment according to claim 1, wherein the fuel cell includes a methanol direct-supply fuel cell.

11. The electronic equipment according to claim 1, wherein the secondary battery includes an Li-ion cell.

12. A battery pack, comprising:
a fuel cell;
a secondary battery; and
a bi-directional voltage converter which is connected between the fuel cell and the secondary battery, and converts bi-directionally an output voltage of the fuel cell and an output voltage of the secondary battery, wherein:
a load apparatus is connected in parallel to the fuel cell and is directly connected to the output of the bi-directional voltage converter on the side of the fuel cell; and
when the electric power generated by the fuel cell is smaller than the electric power consumed in the load apparatus, the bi-directional voltage converter supplies electric power from the secondary battery to the output side of the fuel cell while keeping the voltage constant at both ends of the fuel cell.

13. A load apparatus for which a battery pack including a fuel cell and a secondary battery is used, comprising:
a first voltage converter which outputs a voltage closer to an output voltage of the secondary battery than an output voltage of the fuel cell;
a second voltage converter which outputs a voltage closer to the output voltage of the fuel cell than the output voltage of the secondary battery;
a function circuit which executes a function of the load apparatus, the function circuit being supplied with electric power from the first and second voltage converters;
a first terminal for supplying electric power from the secondary battery to the first voltage converter; and
a second terminal for supplying electric power from the fuel cell to the second voltage converter, wherein:
the load apparatus further includes a switch which connects or disconnects an input of the first voltage converter and an input of the second voltage converter; and
the switch is opened only when the battery pack is attached to the load apparatus, and is closed otherwise.

* * * * *